US007874566B1

(12) United States Patent
Chin et al.

(10) Patent No.: US 7,874,566 B1
(45) Date of Patent: Jan. 25, 2011

(54) DUAL RIDING AND DRIVING TRICYCLE IN JUXTAPOSING LINK

(76) Inventors: Hsu Sheng Chin, No. 8, Lane 194, Gushan 3rd Rd., Gushan District, Kaohsiung (TW) 804; Tsung Lin Fan Chiang, No. 121-1, Sanhe, Sanhe Village, Yujing Township, Tainan County (TW) 714; Chih Ching Chin, No. 8, Lane 194, Gushan 3rd Rd., Gushan District, Kaohsiung (TW) 804

( * ) Notice: Subject to any disclaimer, the term of this patent is extended or adjusted under 35 U.S.C. 154(b) by 0 days.

(21) Appl. No.: 12/507,914

(22) Filed: Jul. 23, 2009

(51) Int. Cl.
*B62K 13/06* (2006.01)

(52) U.S. Cl. ...................... 280/209; 280/7.16
(58) Field of Classification Search ................. 280/204, 280/209, 222, 231, 273, 7.16
See application file for complete search history.

(56) References Cited

U.S. PATENT DOCUMENTS

| 3,175,843 | A | * | 3/1965 | Burke | 280/209 |
|---|---|---|---|---|---|
| 3,350,115 | A | * | 10/1967 | Ferrary | 280/209 |
| 3,865,401 | A | * | 2/1975 | Kingsly | 280/209 |
| 3,902,738 | A | * | 9/1975 | Gandrud | 280/209 |
| 4,290,620 | A | * | 9/1981 | Chika | 280/209 |
| 5,511,809 | A | * | 4/1996 | Sagi | 280/209 |
| 6,022,036 | A | * | 2/2000 | Chartrand | 280/209 |
| 6,068,278 | A | * | 5/2000 | Kock et al. | 280/209 |
| 6,170,844 | B1 | * | 1/2001 | Sasi | 280/209 |
| 6,554,308 | B2 | * | 4/2003 | Black | 280/231 |
| 6,666,468 | B2 | * | 12/2003 | McCandless | 280/209 |

* cited by examiner

*Primary Examiner*—Tony H. Winner
(74) *Attorney, Agent, or Firm*—Bacon & Thomas, PLLC

(57) ABSTRACT

A dual riding and driving tricycle in juxtaposing link comprises a primary bicycle body, an auxiliary cycle body and an articulation mechanism including a resilient tension mechanism.

Primary bicycle body comprises a saddle sat by a primary rider, a front wheel controlled by a steering handle, a rear wheel and a pair of pedals to drive.

Auxiliary cycle body comprises an auxiliary saddle sat by an auxiliary rider, an auxiliary wheel with a hub shaft located between hubs of front wheel and rear wheel in primary bicycle body and a pair of pedals to drive.

Articulation mechanism comprises a left holding base, a right holding base and two parallel linking trough beams being disposed between both holding bases.

Resilient tension mechanism comprises plural elastic elements connected on articulation mechanism respectively. Thereby, primary rider and auxiliary rider can independently tread respective pedals to drive synergistically.

18 Claims, 16 Drawing Sheets

(A-A)

DUAL RIDING AND DRIVING TRICYCLE IN JUXTAPOSING LINK

TECHNICAL FIELD OF THE INVENTION

The present invention relates to a dual riding and driving tricycle in juxtaposing link, particularly for one that can be pedaled by two drivers in side-by-side coordination manner so that the drivers and tricycle will incline integrally in parallel manner without tumbling or overturning possibility.

BACKGROUND OF THE INVENTION

Generally speaking, the bicycle is a kind of very popular transportation means of manpower type. It is all well-known that bicycle is totally unstable when standstill, which must rely on the foot of the rider to maintain the equilibrium. Upon driving turns, inertia makes the bicycle body keep advance along the original direction. If weight center is too high, bicycle speed is too fast or too urgent sharp during turn, even friction force is enough to offer the necessary centripetal force, the centrifugal moment may make the bicycle body rotate and overturn. When bicycle performs turn, by inclination of driver body and bicycle body, the reversed moment can be created to reduce the centrifugal moment, which may cause the bicycle overturn outwards. Basing on this principle and phenomenon, dual riding and driving tricycle in juxtaposing link bicycle is naturally more stable during driving advance comparing with the simple tricycle or four-wheeled vehicle.

Currently, one kind dual-riding bicycle of tandem type, which has double seats being placed one before the other for two riders, such as U.S. Pat. No. 5,716,065 in title of "Tandem bicycle" by inventors: Liu; Ssu-Liu (Taipei, TW) already exists in the market. However, the double seats for two riders in tandem bicycle in the patented tandem bicycle are arranged in linear one-after-another longitudinal fashion, which is very unstable and susceptible to laterally tumble during driving or parking status unless being upheld by side supporter or held by the foot of the rider to maintain the equilibrium when standstill. Besides, the driving power in the patented tandem bicycle is singularly pedaled by the primary rider instead of two riders in synergistically manner.

Moreover, USPTO published patent application case No. 20040144585 in title of "Human powered golf cart with auxiliary power source" by inventors: Vasser, Paul M.; (Aptos, Calif.) disclosed a quadri-cycle of double seats for two riders in side-by-side manner. Although the patented quadricycle golf cart enables two riders to pedal driving power respectively in synergistically manner, the rigid link between double seats for two riders are non-articulatory manner in the quadricycle chassis so that the overall quadricycle body is susceptible to laterally tumble during high speed or turn-making driving fashion.

Additionally, another kind dual-riding bicycle of parallel-linking type also already exists in the market. However, the structure of parallel-linking dual-riding bicycle is linked of two independent bicycles by a fixing rod in rigid manner without articulation flexibility, which results in awkward action during high speed or corner turn; if it is forced to drive in high speed, sharp turn or in passing over bumpy road, the parallel-linking dual-riding bicycles may overturn. Thus, it is only good for children in learning walk.

Having realized and addressed all the foregoing issues as well as sensed the promotion in recreation effect for the dual riding and driving bicycle, the applicant of the present invention paid utmost attention in research and development for a long term. Eventually, the "dual riding and driving tricycle in juxtaposing link" of the present invention is successfully contrived out.

SUMMARY OF THE INVENTION

The primary object of the present invention is to provide a tricycle that can be dual driven by two riders sitting on separated saddles of different primary bicycle body and auxiliary cycle body in side-by-side manner so that each of two riders can independently treads each associated pedals to offer individual driving power for the tricycle in synergistically manner.

The second object of the present invention is to provide a tricycle that the separated primary bicycle body and auxiliary cycle body are linked by an articulation mechanism including a resilient tension mechanism so that highly balanced stability is always kept even the tricycle runs over a bumpy road, ground of drop height or makes turn. Besides, the tricycle features to have a hypothetical acute triangle that is defined by three contact points with ground for an auxiliary wheel of the auxiliary cycle body as well as a rear wheel and a front wheel of the primary bicycle body as three vertices of the hypothetical acute triangle so that not only the safety is secured for overall tricycle and riders of the present invention without any risk of overturn or tumble down during riding the tricycle but also the balanced stability is always kept in standstill during parking the tricycle.

The third object of the present invention is to provide a tricycle that has an auxiliary wheel of the auxiliary cycle body disposed on a hub shaft, which is firmly connected to each corresponding crank of the right pedal and left pedal respectively.

The fourth object of the present invention is to provide a tricycle that has a gear box containing directly meshed an active gear and a passive gear with idle wheel set so that not only the structure of the tricycle becomes simple but also both manufacturing cost and maintenance expense can be reduced.

The fifth object of the present invention is to provide a tricycle that has a changeable gear cluster and a gear set, which contains a major active gear and a minor passive gear; Thereby, the changeable gear cluster and gear set are linked to be able to mutually drive each other by a pair of loop chains.

The final object of the present invention is to provide a tricycle that the primary bicycle body, which is similar to the basic structure of the conventional bicycle popularly marketed currently, has a rear wheel and a front wheel while the auxiliary cycle body has an auxiliary wheel such that both of the primary bicycle body and auxiliary cycle body are linked in juxtaposition via at least a articulation mechanism.

DETAILED DESCRIPTION OF THE PREFERRED EMBODIMENTS

Figure 1:
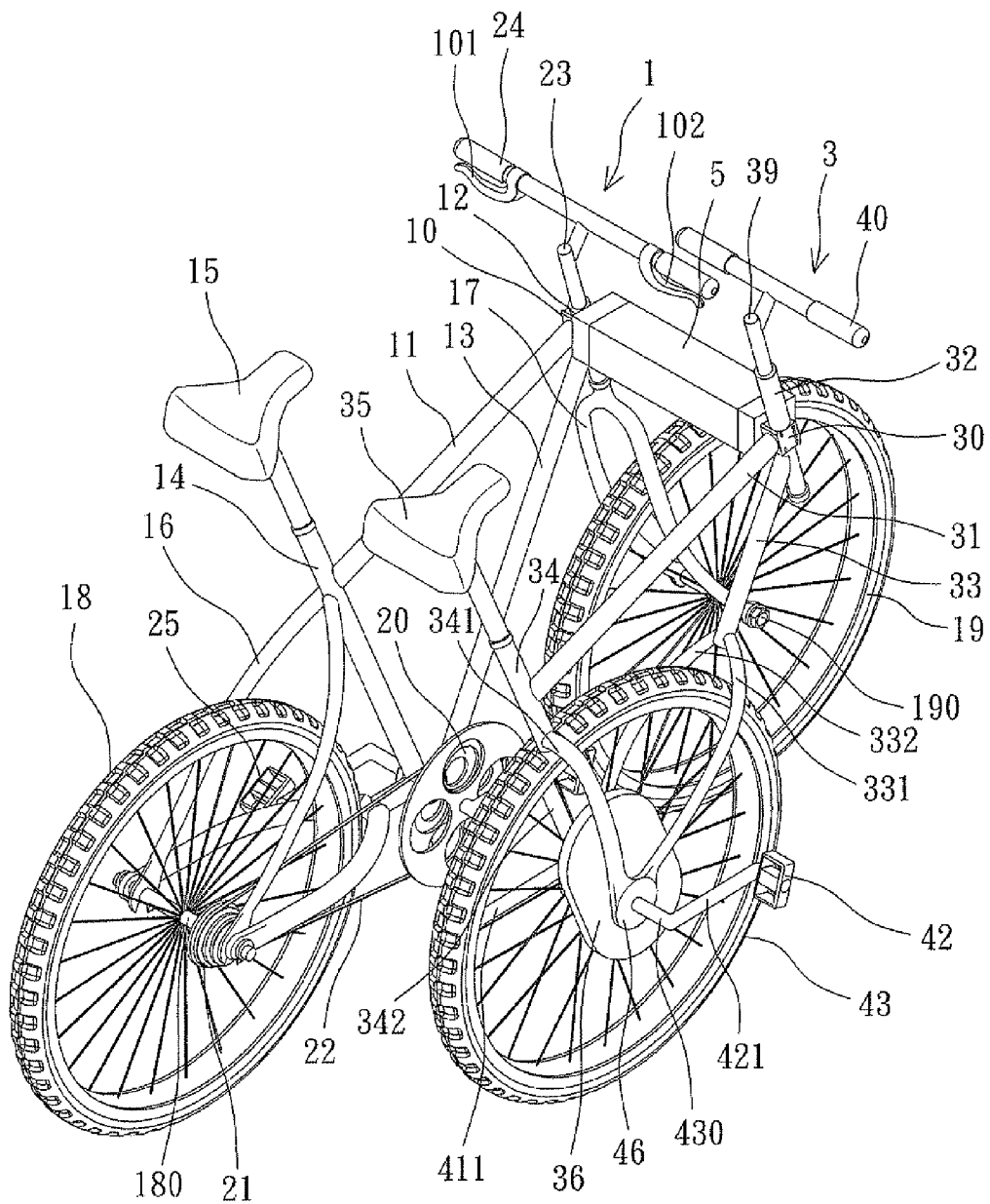
FIG. 1 is a perspective schematic view for the first exemplary embodiment for the dual riding and driving tricycle in juxtaposing link of the present invention.
Figure 2:
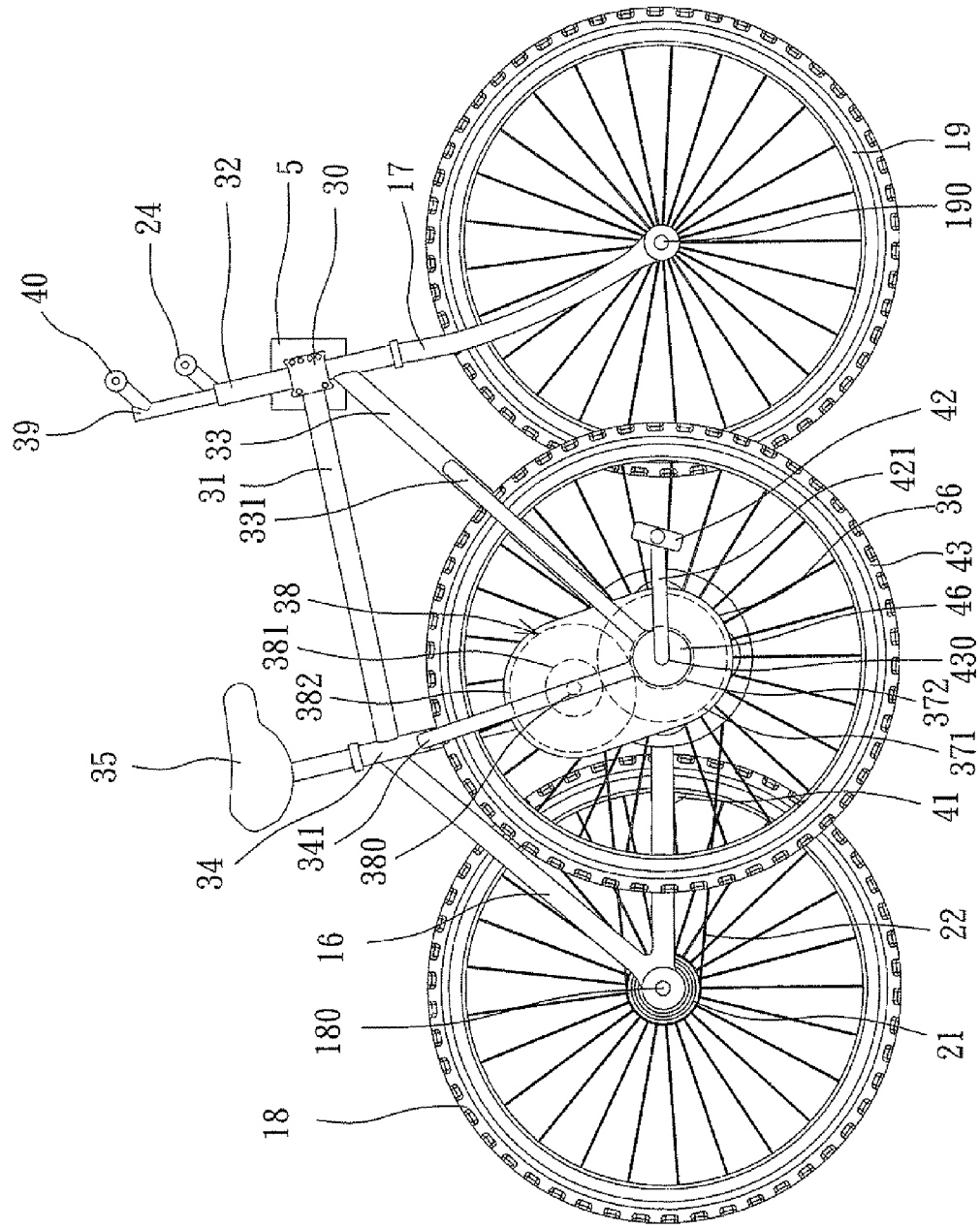
FIG. 2 is a right lateral view of the FIG. 1 for the present invention.
Figure 3:
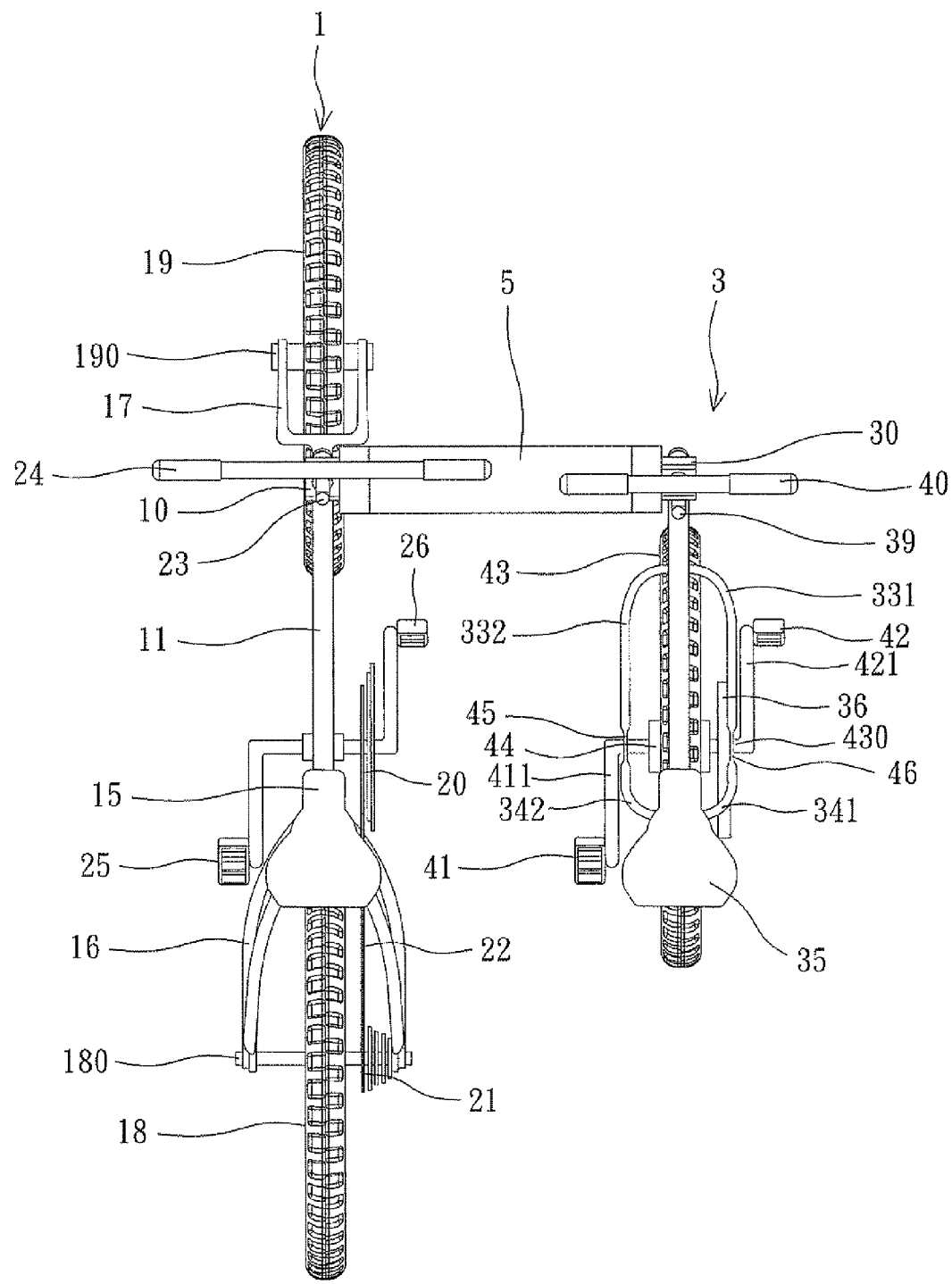
FIG. 3 is a top view of the FIG. 1 for the present invention.

Please refer to FIGS. 1 through 3. FIG. 1 is a perspective schematic view for the first exemplary embodiment for the dual riding and driving tricycle in juxtaposing link of the present invention. The tricycle comprises a primary bicycle body 1 with a primary saddle 15, an auxiliary cycle body 3 with an auxiliary saddle 35 and an articulation mechanism 5 including a resilient tension mechanism such that the primary saddle 15 on the primary bicycle body 1 and the auxiliary saddle 35 on the auxiliary cycle body 3 are juxtaposed in parallel side-by-side fashion instead of in linear one-after-another longitudinal tandem fashion, wherein:

Said primary bicycle body 1, which is similar to the basic structure of the conventional bicycle popularly marketed currently with structural feature in independently active driving mechanism, comprises a linking block 10 with plural positioning holes, a steering handle 24 with two brake levers 101, 102, a cross top bar 11, a head sleeve tube 12 having a front stem 23 inserted therein, a down bar 13, an upright seat bar 14 having a saddle 15 on the top end thereof, a rear folk 16 having a rear wheel 18 with a hub 180, a front folk 17 having a front wheel 19 with a hub 190 and a primary driving mechanism that includes a major front sprocket wheel 20 with a pair of pedals 25, 26 disposed at the joint of the down bar 13 and upright seat bar 14, a minor rear gear cluster 21 coaxially disposed with the hub 180 of the rear wheel 18 and a loop chain 22 linked the front sprocket wheel 20 and rear gear cluster 21 respectively so that the primary rider sit on the primary saddle 15 can tread the pair pedals 25, 26 to offer a driving power to forwardly drive the primary bicycle body 1 moving on.

Figure 6:
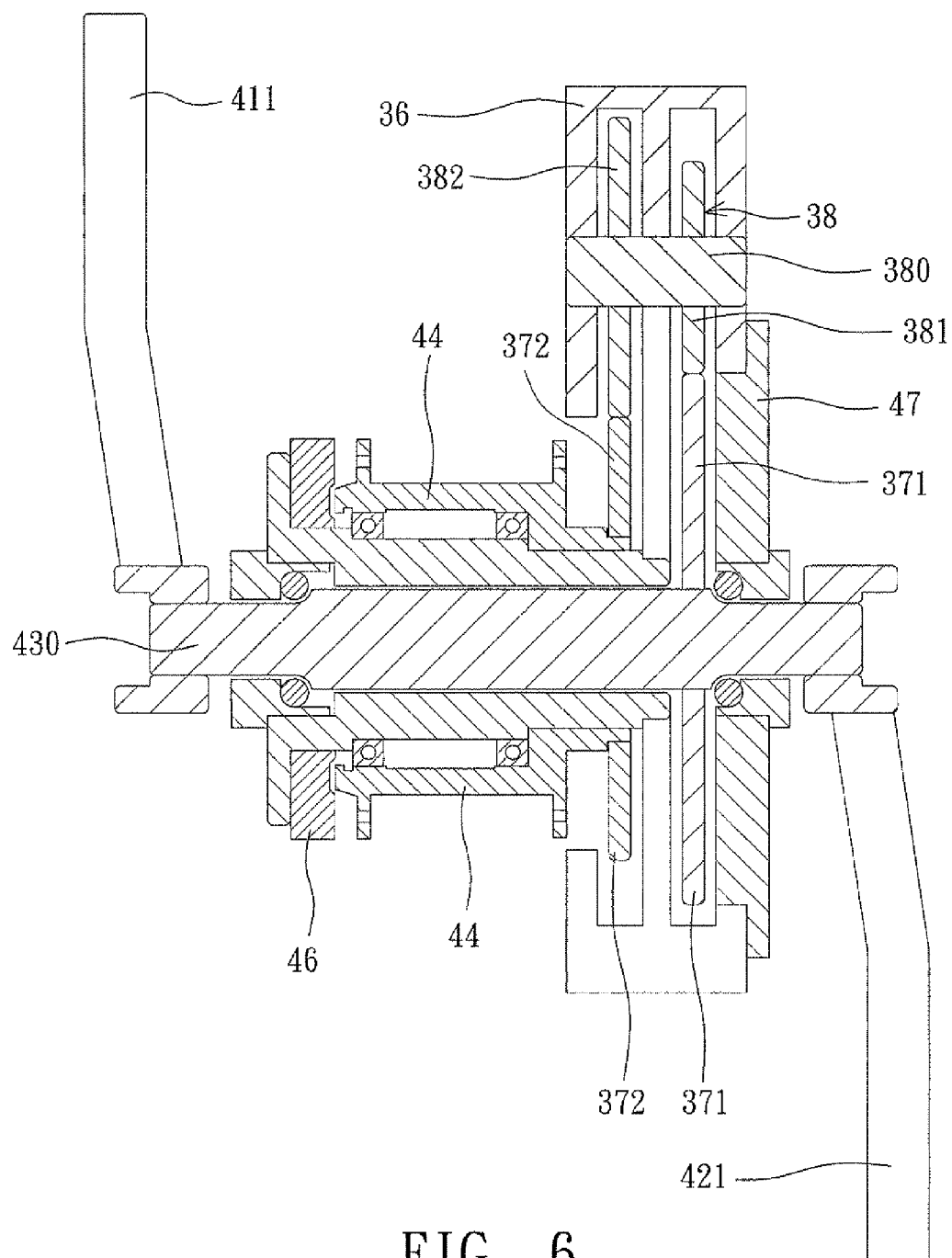
FIG. 6 is a cross section structural view showing the combination of related components for the auxiliary cycle body of the present invention.

Said auxiliary cycle body 3, which have neither front folk nor front wheel as in the primary bicycle body 1, comprises a linking block 30 with plural positioning holes 300, a holding handle 40 without brake lever, a cross top bar 31, a head sleeve tube 32 having a front stem 39 inserted therein, a down bar 33, an upright seat bar 34, an auxiliary saddle 35 on the top end of the upright seat bar 34, an auxiliary wheel 43 and an auxiliary driving mechanism having a pair of pedals 41, 42; A pair of crotched backward prongs 331, 332 are created at the bottom end of the down bar 33 and a pair of crotched downward prongs 341, 342 are created at the bottom end of the upright seat bar 34 such that both free pair ends of the crotched backward prongs 331, 332 and crotched downward prongs 341, 342 joint at a pair of separated fixing jointers 45, 46, where the auxiliary wheel 43 is disposed (as shown in FIGS. 1 and 3); A removable hub boss 44 is integrally fixed on a hub of the auxiliary wheel 43, where a hub shaft 430 is disposed therein such that each individual crank 411, 421 with each corresponding pedal 41, 42 is extended in lateral manner respectively; a fixed active gear 371 and a removable passive gear 372, which are encased in a gear box 36, are disposed around the hub of the auxiliary wheel 43 in coaxial fashion but rotate independently such that the active gear 371 is driven by the pair pedals 41, 42 and the passive gear 372 can drive the removable hub boss 44; Said gear box 36, which is firmly fixed on the right side of the fixing jointer 46, contains a idle wheel set 38 of a minor idle wheel 381 and a major idle wheel 382; both minor idle wheel 381 and a major idle wheel 382 are disposed around a shaft 380 in coaxial fashion and co-rotating in interlocked manner so that each minor idle wheel 381 and major idle wheel 382 are meshed with each corresponding active gear 371 and passive gear 372 respectively (as shown in FIGS. 1 and 6).

The redundant description for operation mode of the primary driving mechanism is saved here as it is a well-known technology while the operation mode of the auxiliary driving mechanism is described as below:

Firstly, once the active gear 371 is driven by the pair pedals 41, 42, the minor idle wheel 381 is driven by the active gear 371 due to being meshed mutually; secondly, the major idle wheel 382 is driven by the minor idle wheel 381 via coaxial interlocked manner;

thirdly, the passive gear 372 is driven by the major idle wheel 382 due to being meshed mutually;

fourthly, the removable hub boss 44 is driven by the passive gear 372 via coaxial interlocked manner; and finally, the auxiliary wheel 43 is driven by the removable hub boss 44 due to being firmly fixed mutually.

Thus, by proper selection each diameter proportions or gear ratios for each meshed pair active gear 371 with minor idle wheel 381 and pair major idle wheel 382 with passive gear 372, the desired driving momentum via treading the pedals 41, 42 for the auxiliary cycle body 3 is obtained at the discretion of the auxiliary rider on the auxiliary saddle 35; Namely, the auxiliary rider sit on the auxiliary saddle 35 can tread the pair pedals 41, 42 to offer a driving power to forwardly drive the auxiliary cycle body 3 with result that the overall tricycle is moved on; Therefore, the auxiliary cycle body 3 also has structural feature in independently active driving mechanism as that for the primary bicycle body 1.

Figure 7:
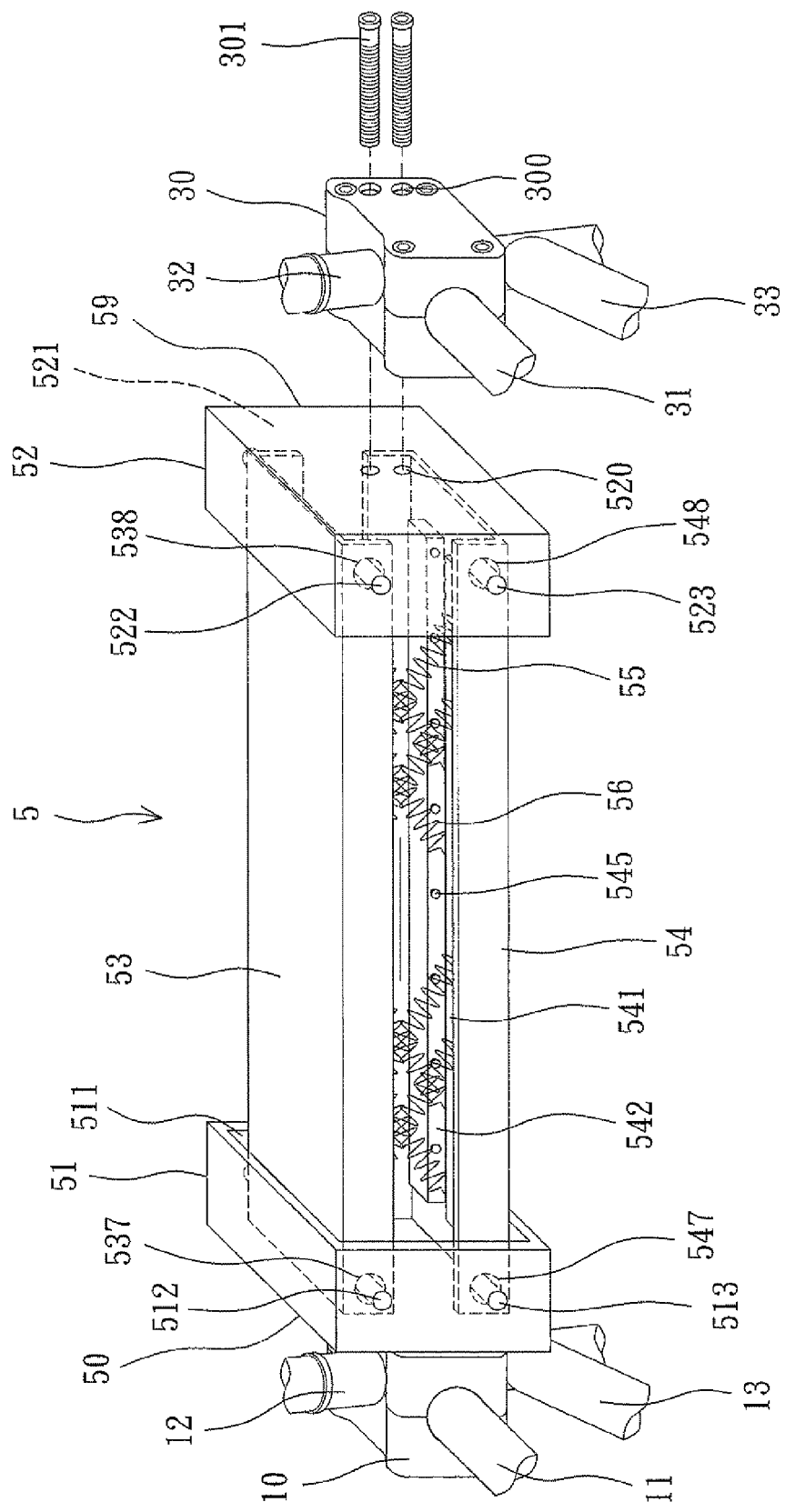
FIG. 7 is a schematic view showing the structure of the articulation mechanism for the present invention.

Said articulation mechanism 5, please refer to FIGS. 1 and 7, comprises a left holding base 51 abutted a first linking terminal 50, a right holding base 52 abutted a second linking terminal 59 such that the right holding base 52 is securely locked on the linking block 30 at the head sleeve tube 32 of the auxiliary cycle body 3 via plural bolts 301 running through plural positioning holes 300 in the linking block 30 and corresponding plural round bores 520 in the right holding base 52 while left holding base 51 is securely locked on the linking block 10 at the head sleeve tube 12 of the primary bicycle body 1 via plural bolts 301 running through plural positioning holes 300 in the linking block 10 and corresponding plural round bores 520 in the left holding base 51 (not shown in figure) in same manner as that of the right holding base 52; Wherein, said left holding base 51 includes a holding compartment 511 with an opening end facing inwardly while right holding base 52 includes a holding compartment 512 with a opening end facing inwardly too such that two linking trough beams 53, 54 are disposed are disposed between the left holding base 51 and right holding base 52 in parallel manner of up-and-down juxtaposition, wherein a round bore 537 and a round bore 538 are created in each end of the linking trough beam 53 respectively while a round bore 547 and a round bore 548 are created in each end of the linking trough beam 54 respectively; Thereby, a pivotal articulatory parallelogram is formed by the left holding base 51 and right holding base 52 as well as the pair parallel linking trough beams 53, 54 and features in function as synergistic pivotal articulations at four joints vertices of both ends of the linking trough beam 53 and both ends of the linking trough beam 54; Thus, the saddle 15 of the primary bicycle body 1 and the saddle 35 of the auxiliary cycle body 3 are always kept in parallel fashion.

Figure 9:
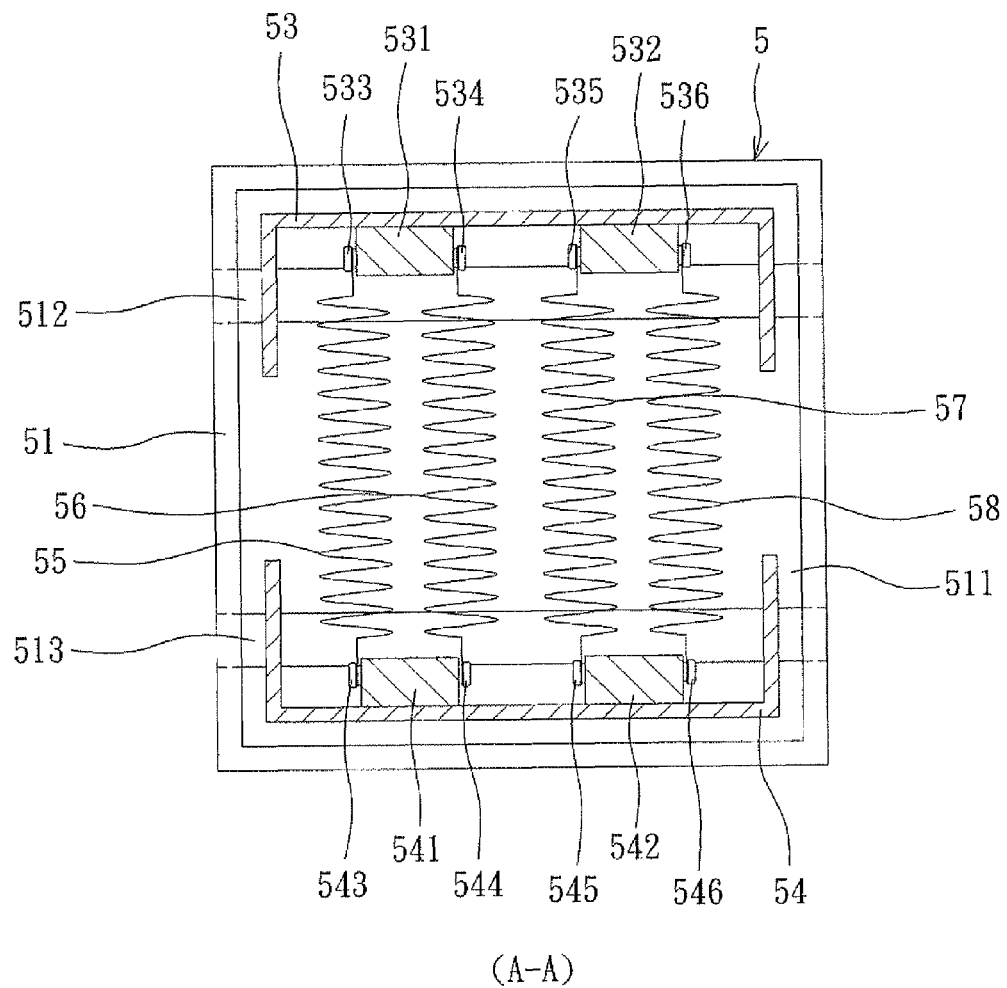
FIG. 9 is a cross section view taken along line A-A from the previous FIG. 8 for the present invention.

Please refer to FIG. 9. The linking trough beam 53, which is ⊓-shaped with an opening facing downwardly, internally integrates a pair of parallel upper internal mount beams 531, 532, each of which is created two rows of fixed holes 533, 534 and fixed holes 535, 536 on both longitudinal sides in even distribution while linking trough beam 54, which is ⌣-shaped with an opening facing upwardly, internally integrates a pair of parallel lower internal mount beams 541, 542, each of which is created two other rows of fixed holes 543, 544 and fixed holes 545, 546 on both longitudinal sides in even distribution.

A resilient tension mechanism is configured in the articulation mechanism 5 by suitable arrangement of certain plural elastic elements 55, 56, 57, 58, which are preferably arranged in diagonally crisscross fashion as shown in FIGS. 7 through 10 for the exemplary embodiment via both ends of each said plural elastic elements 55, 56, 57, 58 being securely hooked on each corresponding fixed holes 533, 534 on the upper internal mount beam 531 and each other corresponding fixed holes 543, 544 on the lower internal mount beam 541 respectively as well as each corresponding fixed holes 535, 536 on the upper internal mount beam 532 and each other corresponding fixed holes 545, 546 on the lower internal mount beam 542 respectively.

Figure 8:
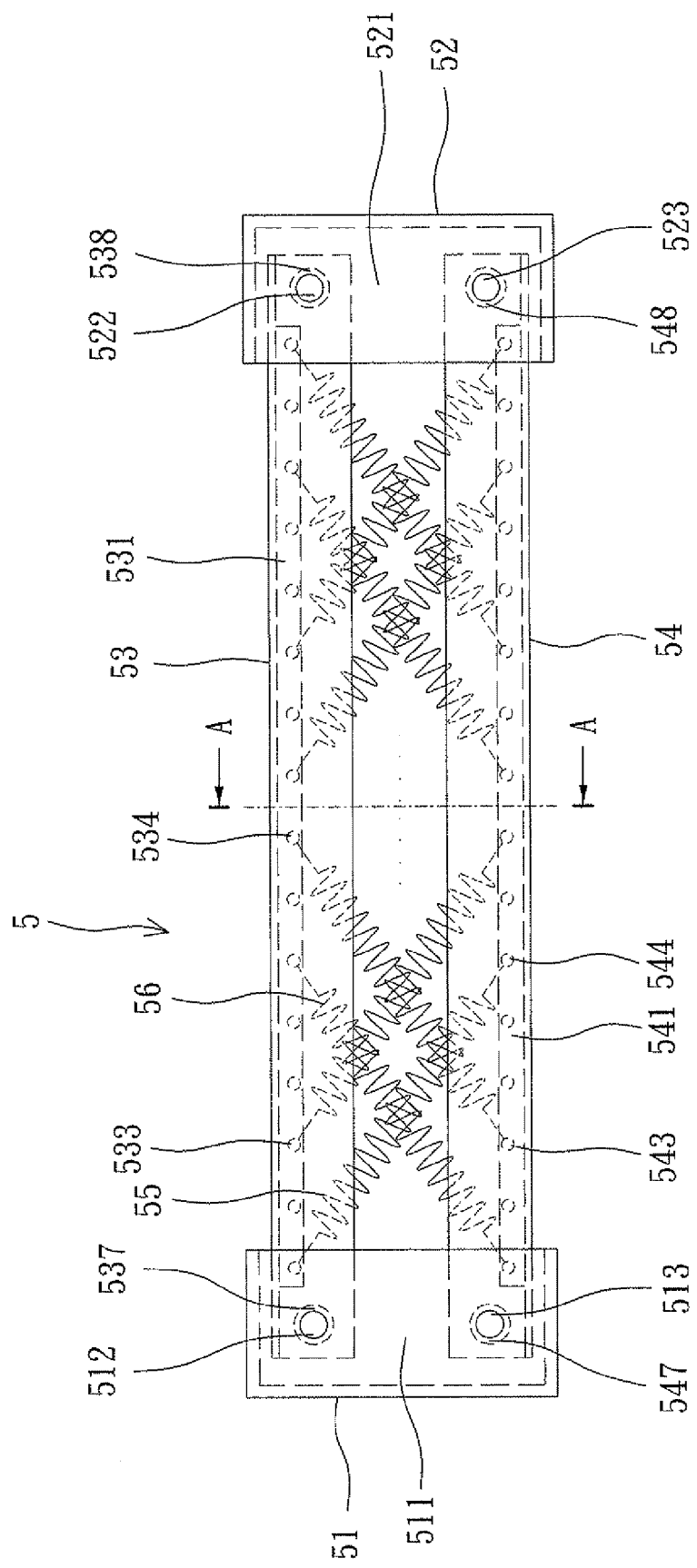
FIG. 8 is a lateral view showing the structure of the articulation mechanism for the present invention.

Please refer to FIGS. 8 and 9. Both elastic element 55 and elastic element 57 skew in same diagonal direction but being hooked in different pair of internal mount beams 531, 541 and pair of internal mount beams 532, 542 while both elastic element 56 and elastic element 58 skew in same diagonal direction but being hooked in different pair of internal mount beams 531, 541 and pair of internal mount beams 532, 542 such that both elastic element 55 and elastic element 57 remotely crisscross both elastic element 56 and elastic element 58 in separated manner.

Please refer to FIGS. 8 and 9. Besides, the elastic elements 55, 56, 57, 58 can be springs of strong resilience with options in various elasticity coefficients; Naturally, the resilient function of the resilient tension mechanism for the elastic elements 55, 56, 57, 58 can also be enhanced by braiding each elastic element of each single crisscross pair elastic elements 55, 56 and elastic elements 57, 58 in the articulation mechanism 5 into multi-stranded string or arranging into multiple crisscross pair array so that the sitting status of the auxiliary cycle body 3 in standstill manner is surely kept in horizontal level without any forward slope or backward slope.

Please refer to FIGS. 7 and 8. A round bore 537 and a round bore 538 are created in each end of the linking trough beam 53 respectively while a round bore 547 and a round bore 548 are created in each end of the linking trough beam 54 respectively so that both ends of the linking trough beam 53 and both ends of the linking trough beam 54 can be securely linked by a linking shaft 512 and a linking shaft 513 of the left holding base 51 and a linking shaft 522 and a linking shaft 523 of the right holding base 52 respectively as in linking manner; Moreover, all the same outer diameters of the linking shafts 512, 513, 522, 523 are slightly smaller than all the same inner diameters of the round bores 537, 538, 547, 548 so that both ends of the linking trough beam 53 and both ends of the linking trough beam 54 can be pivoted around the joints of the round bores 537, 538, 547, 548 and linking shafts 512, 513, 522, 523 in parallel manner without losing linking manner; Thus, the quadrangle, which is formed by the left holding base 51 and right holding base 52 as well as the pair parallel linking trough beams 53, 54, is skewed into a parallelogram upon being suffered from external stress due to the pivotal feature for both ends of the linking trough beam 53 and both ends of the linking trough beam 54 around the joints of the round bores 537, 538, 547, 548 and linking shafts 512, 513, 522, 523; Consequently, the pivotal feature aforesaid functions as a pivotal articulation of automatic adaptability to provide a flexible allowance in keeping stability for the tricycle of the present invention running over bumpy roads or making turn.

Figure 5:
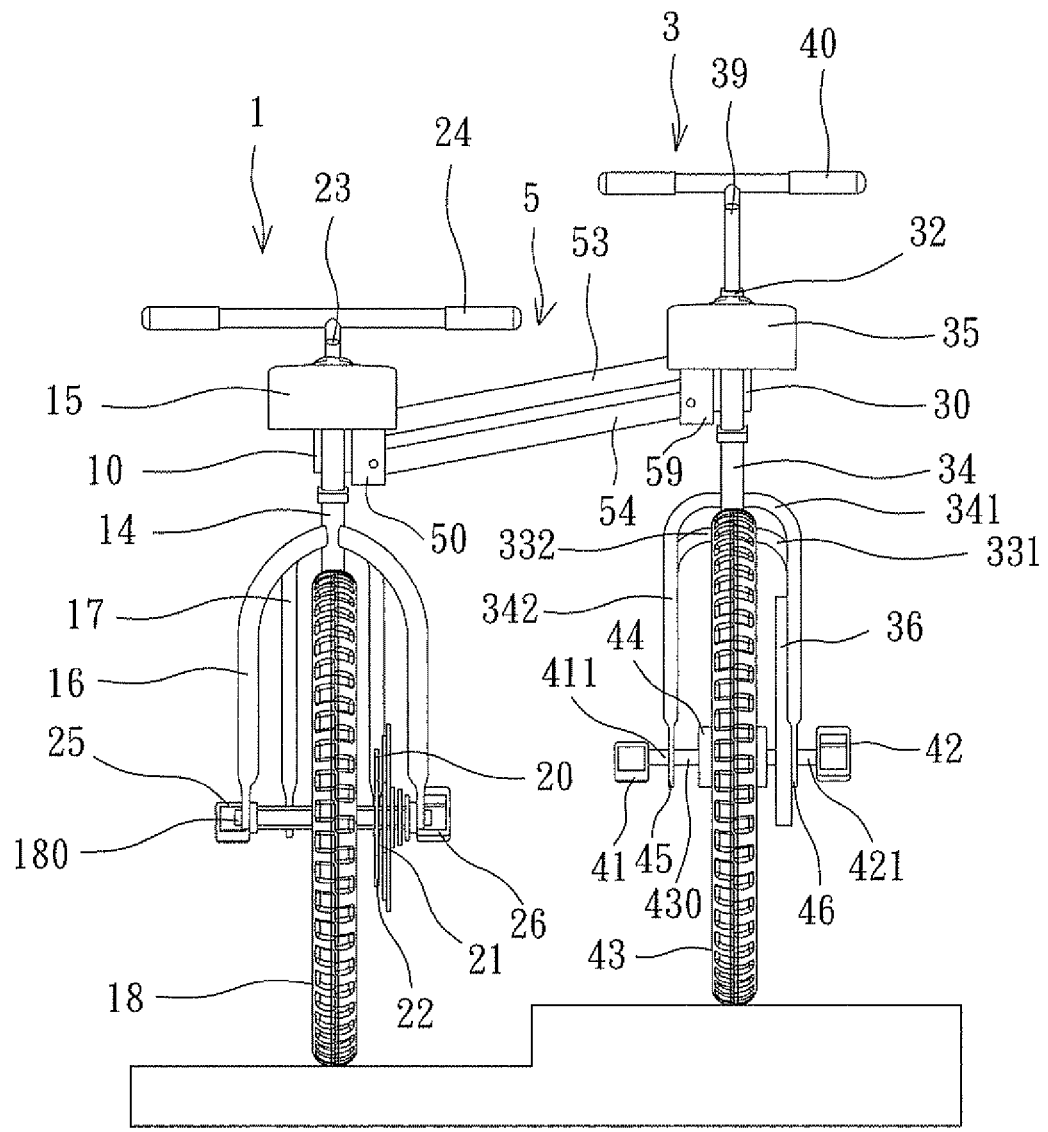
FIG. 5 is an operational view showing the acting status of the integral body for the tricycle of the present invention passing over the bumpy road.

When the tricycle of the present invention runs over a bumpy road or ground of drop height such as road surface under the right auxiliary cycle body 3 is higher than road surface under the left primary bicycle body 1 as shown in FIG. 5, the left holding base 51 of the articulation mechanism 5 will be descended along with the linking block 10 of the primary bicycle body 1 while the right holding base 52 of the articulation mechanism 5 will be ascended along with the linking block 30 of the auxiliary cycle body 3 so that both linking trough beams 53, 54 of the articulation mechanism 5 will decline leftwards and the quadrangle, which is formed by the left holding base 51 and right holding base 52 as well as the pair parallel linking trough beams 53, 54, is skewed into a parallelogram in leftward declination but the linkage of auxiliary cycle body 3 and primary bicycle body 1 with the articulation mechanism 5 is always firmly kept; Meanwhile, the leftward declined parallelogram, which is formed by the left holding base 51 and right holding base 52 as well as the pair parallel linking trough beams 53, 54, also makes the elastic elements 55, 57 stretch in extended manner with a contracting resilient counteraction while makes the elastic elements 56, 58 contract in compressed manner with a stretching resilient counteraction so that both of contracting resilient counteraction by the elastic elements 55, 57 and stretching resilient counteraction by the elastic elements 56, 58 can just offset the stress being suffered to protect the stability of the tricycle in the present invention.

Figure 4:
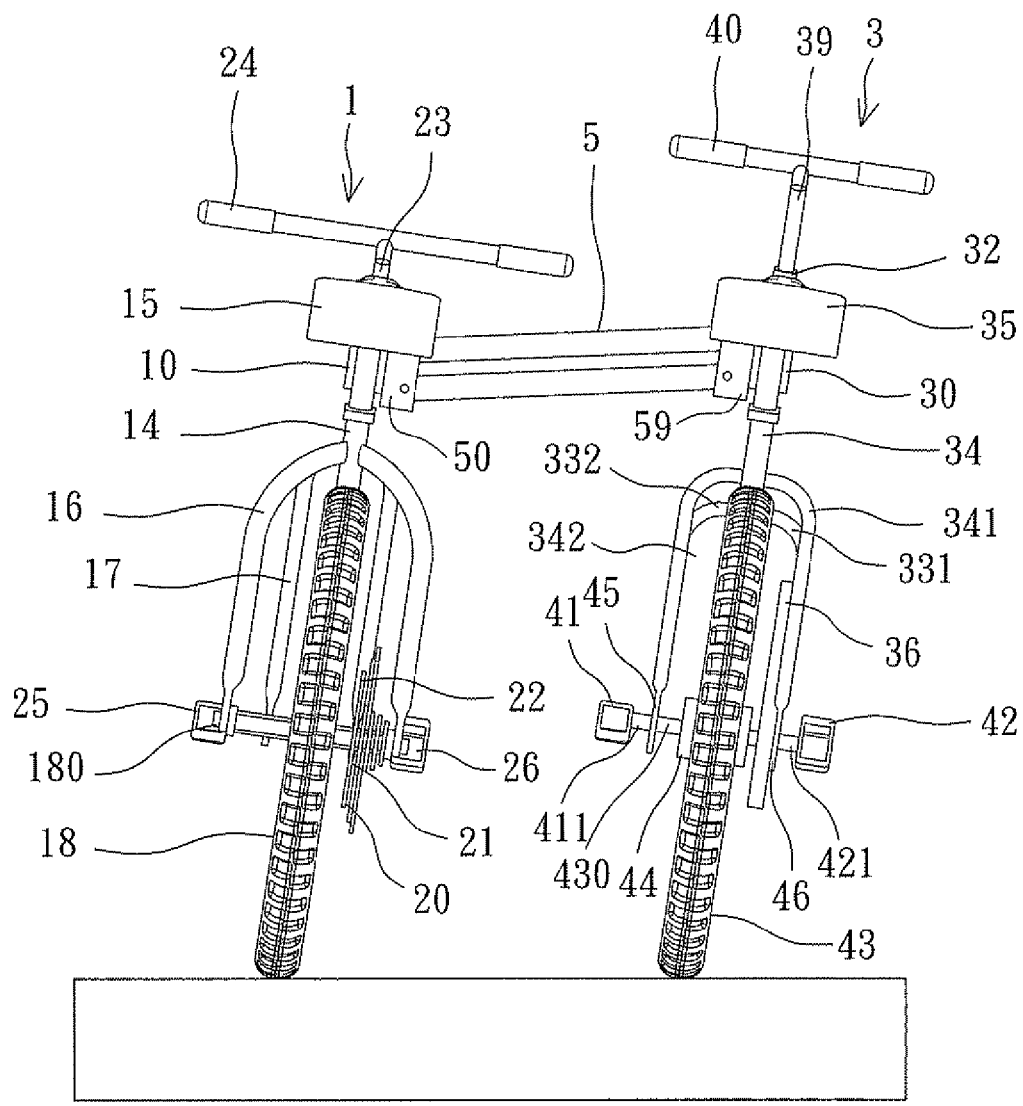
FIG. 4 is an operational view showing the acting status of the integral body for the tricycle of the present invention during right turn.
Figure 10:
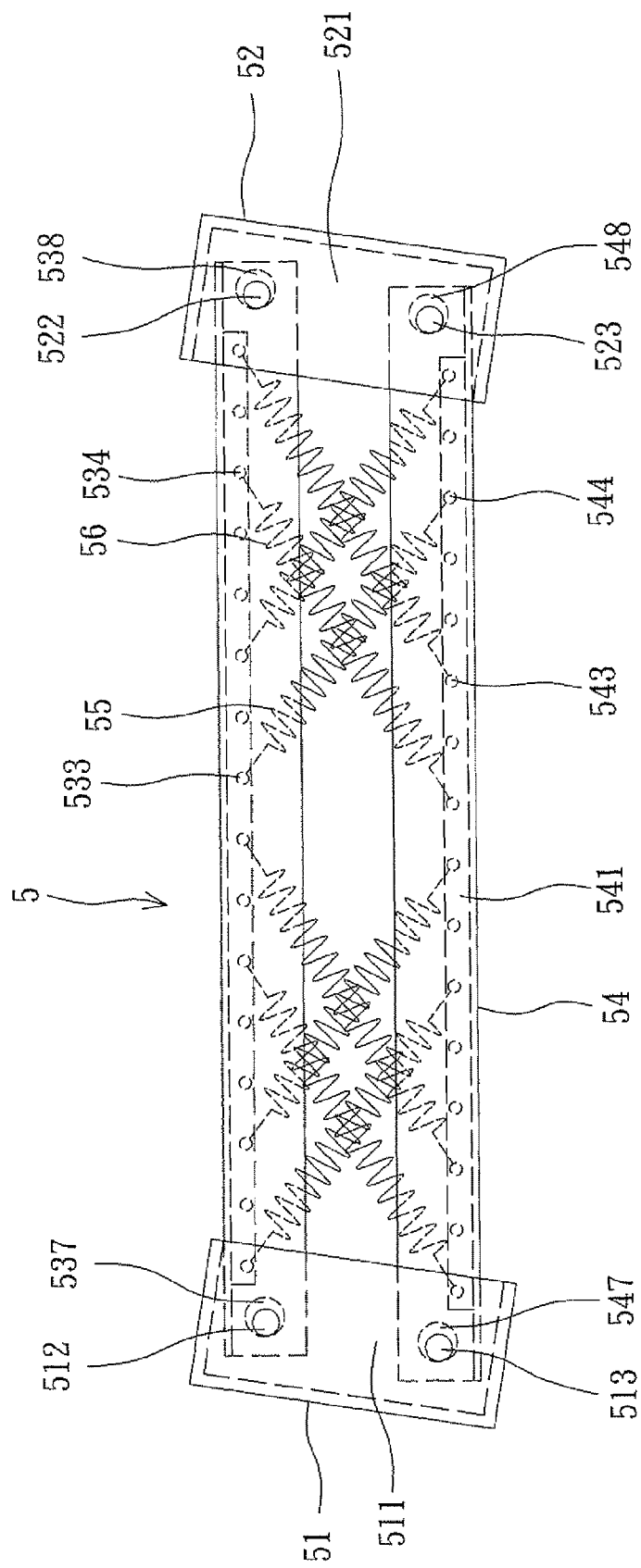
FIG. 10 is an operational view showing the acting status of the articulation mechanism for the tricycle of the present invention during right turn.

When the tricycle of the present invention makes a right turn with rightward inclination to react for the centrifugal force as shown in FIGS. 4 and 10, the relative height of the auxiliary cycle body 3 seems to be higher than that of the primary bicycle body 1 from a view-line orthogonal to the tricycle side; Likewise, the parallelogram, which is formed by the left holding base 51 and right holding base 52 as well as the pair parallel linking trough beams 53, 54, in the articulation mechanism 5 also functions as an pivotal articulation of automatic adaptability to deform in skew manner in accordance with the degree for the rightward inclination of the tricycle in the present invention so that not only the synergistic linkage between the auxiliary cycle body 3 and the primary bicycle body 1 is always kept but also the balanced stability for the overall tricycle of the present invention is maintained without any possibility in overturning or tumble down. In order to reinforce the strength of the pivotal articulatory parallelogram, which is formed by the left holding base 51 and right holding base 52 as well as the pair parallel linking trough beams 53, 54 and features in function as synergistic pivotal articulations at four joints (vertices), not only steel material is used to make all related components but also contact areas at the joints between both pair ends of the pair parallel linking trough beams 53, 54 with the left holding base 51 and right holding base 52 are augmented to avoid undesired strain due to big stress. Similarly, when the tricycle of the present invention runs over a ground of drop height such as road surface under the right auxiliary cycle body 3 is lower than road surface under the left primary bicycle body 1 or makes a left turn, the same physical means of the pivotal articulatory parallelogram will function likewise as disclosure aforesaid but with leftward inclination so that detailed description is saved to avoid redundant disclosure.

The primary feature for the tricycle of the present invention is that not only the primary bicycle body 1 and the auxiliary cycle body 3 are parallel in longitudinal direction but also the hub shaft 430 of the auxiliary wheel 43 for the auxiliary cycle body 3 is relatively located between the hubs 180, 190 of the rear wheel 18 and front wheel 19 in the primary bicycle body 1 along longitudinal direction as shown in FIGS. 2 and 3 so that a hypothetical triangle, which is defined by three contact points with ground for the auxiliary wheel 43 of the auxiliary cycle body 3 as well as rear wheel 18 and front wheel 19 of the primary bicycle body 1 as three vertices of the hypothetical triangle, has both vertex angles formed at rear wheel 18 and front wheel 19 are acute angles; Thereby, the weight centers of the primary rider and auxiliary rider will not pass beyond the area encompassed by the hypothetical acute triangle so that not only the balanced stability is always kept but also the safety is secured for overall tricycle and riders of the present invention without any risk of overturn or tumble down.

Figure 16:
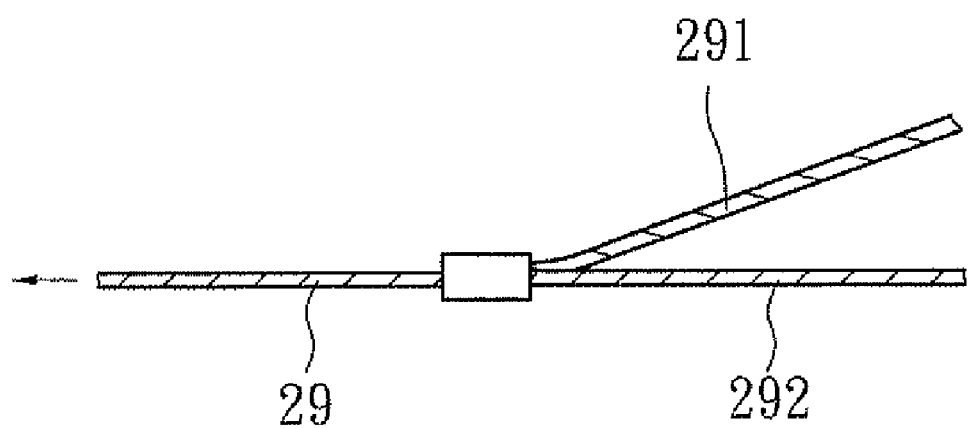
FIG. 16 is the schematic view showing the rear wheel brake wire having two shunt brake wires for the present invention.

Both steering handle 24 on the primary bicycle body 1 and holding handle 40 on the auxiliary cycle body 3 are equipped with function of height adjustment, which is not to be described here in redundant manner as it is a well-known structural technology. A brake for front wheel 19 of the primary bicycle body 1 is wired to the right brake lever 102 on the steering handle 24 while no counterpart brake or wire in the auxiliary cycle body 3 because of no front wheel disposed therein. A brake system for the rear wheel 18 of the primary bicycle body 1 and the auxiliary wheel 43 associated to the auxiliary cycle body 3 is functioned by a rear wheel brake wire 29 with two shunt brake wires 291, 292 such that the free end of the rear wheel brake wire 29 is connected to the left brake lever 101 on the steering handle 24 while each free end of both shunt brake wires 291, 292 is connected to the rear wheel 18 brake of the primary bicycle body 1 and the auxiliary wheel 43 brake associated to the auxiliary cycle body 3 as shown in FIG. 16 for safety purpose.

Please refer to FIGS. 11 through 14, which show the second exemplary embodiment in the dual riding and driving tricycle in juxtaposing link of the present invention. As in the previous first exemplary embodiment, the tricycle for the second exemplary embodiment comprises a primary bicycle body 1, an auxiliary cycle body 6 and an articulation mechanism 5, wherein said primary bicycle body 1 is identical to that in the first exemplary embodiment while said auxiliary cycle body 6 further comprises a rear folk 66 integrally with a pair of cross down prongs 661, 662 other than counterparts of a linking block 60, a holding handle 70 without brake lever, a cross top bar 61, a head sleeve tube 62 having a front stem 69 inserted therein, a down bar 63, an upright seat bar 64 having a auxiliary saddle 65 on the top end thereof, a major active gear 671, a minor passive gear 672 and a pair of pedals 71, 72 with each individual crank 711, 721, wherein a pair of crotched backward prongs 631, 632 are created at the bottom end of the down bar 63 and a pair of crotched downward prongs 641, 642 are created at the bottom end of the upright seat bar 64 such that both free pair ends of the crotched backward prongs 631, 632 and crotched downward prongs 641, 642 joint at a pair of fixing jointers 65, 66, where an auxiliary wheel 73 is disposed; A removable hub boss 74 is firmly fixed on the hub of the auxiliary wheel 73, where a hub shaft 730 is disposed therein.

Figure 11:
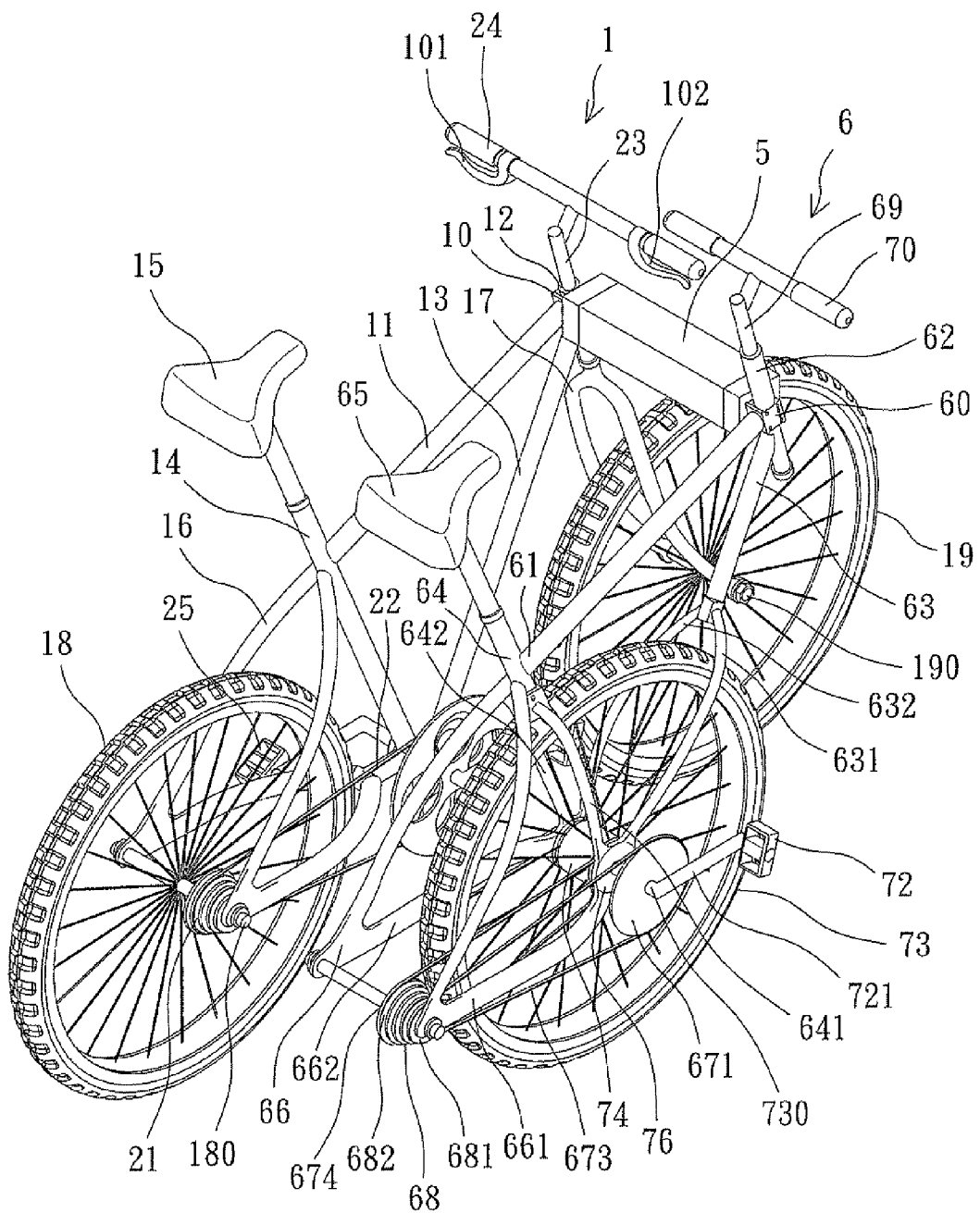
FIG. 11 is a perspective schematic view for the second exemplary embodiment in the dual riding and driving tricycle in juxtaposing link of the present invention.
Figure 12:
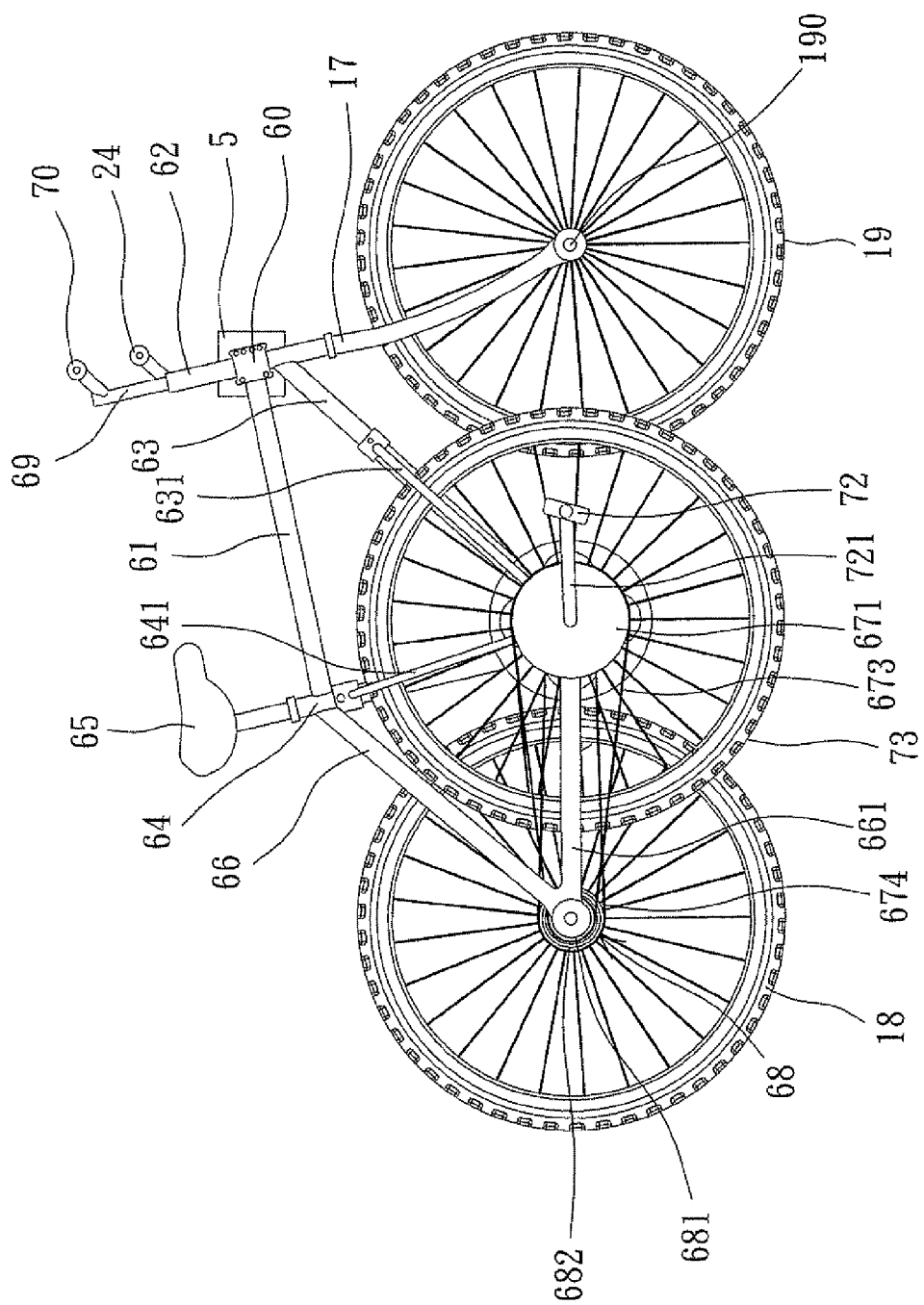
FIG. 12 is a right lateral view of the FIG. 11 for the present invention.
Figure 13:
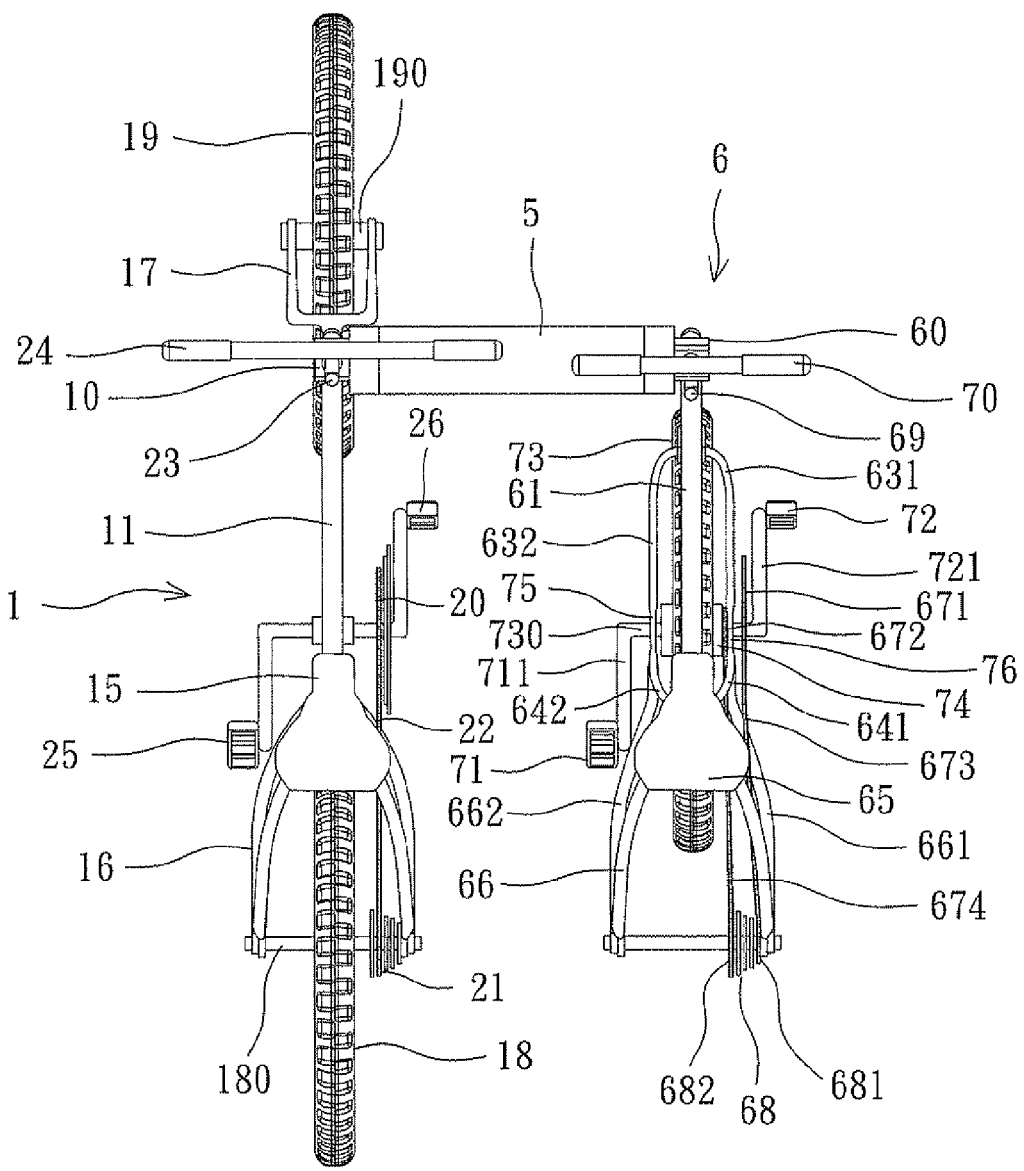
FIG. 13 is a top view of the FIG. 11 for the present invention.
Figure 14:
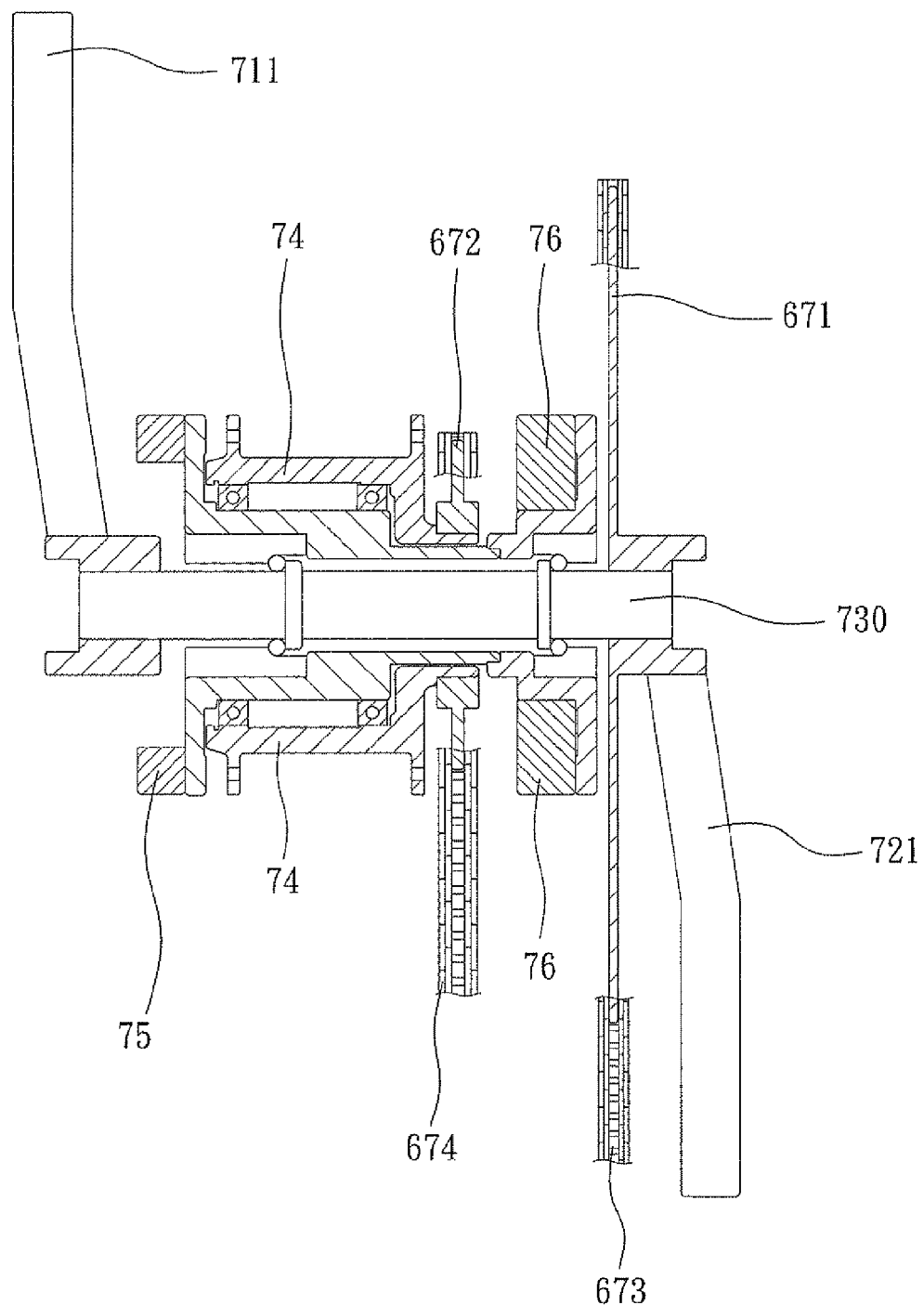
FIG. 14 is a schematic view of the FIG. 11 showing the combination of related components for the auxiliary cycle body for the second exemplary embodiment in the dual riding and driving tricycle in juxtaposing link of the present invention.

Please refer to FIGS. 11 and 14. A pair of crank 711, 721 with each corresponding pedal 41, 42 is extended in lateral manner respectively; the major active gear 671 and minor passive gear 672 are disposed around the hub of the auxiliary wheel 43 in coaxial fashion but rotate independently such that the major active gear 671 is driven by the pair pedals 71, 72 and the minor passive gear 672 can drive the removable hub boss 74; A changeable gear cluster 68 including a minor derailleur sprocket 681 and a major derailleur sprocket 682 of different diameters are disposed at the joint end of the rear folk 66 and pair cross down prongs 661, 662 so that the derailleur sprockets 681, 682 are linked to the major active gear 671 and minor passive gear 672 by an external loop chain 673 and an internal loop chain 674 respectively so as to have independently active driving mechanism for the auxiliary cycle body 6; Namely, once the major active gear 671 is driven by the pair pedals 71, 72, the minor derailleur sprocket 681 is driven by the major active gear 671 via linkage of the external loop chain 673, then the major derailleur sprocket 682 is driven by the minor derailleur sprocket 681 via coaxial interlocked manner, finally the minor passive gear 672 with auxiliary wheel 73 is driven by the major derailleur sprocket 682 via linkage of the internal loop chain 674; Therefore, the auxiliary cycle body 6 also has structural feature in independently active driving mechanism as that for the primary bicycle body 1.

Figure 15:
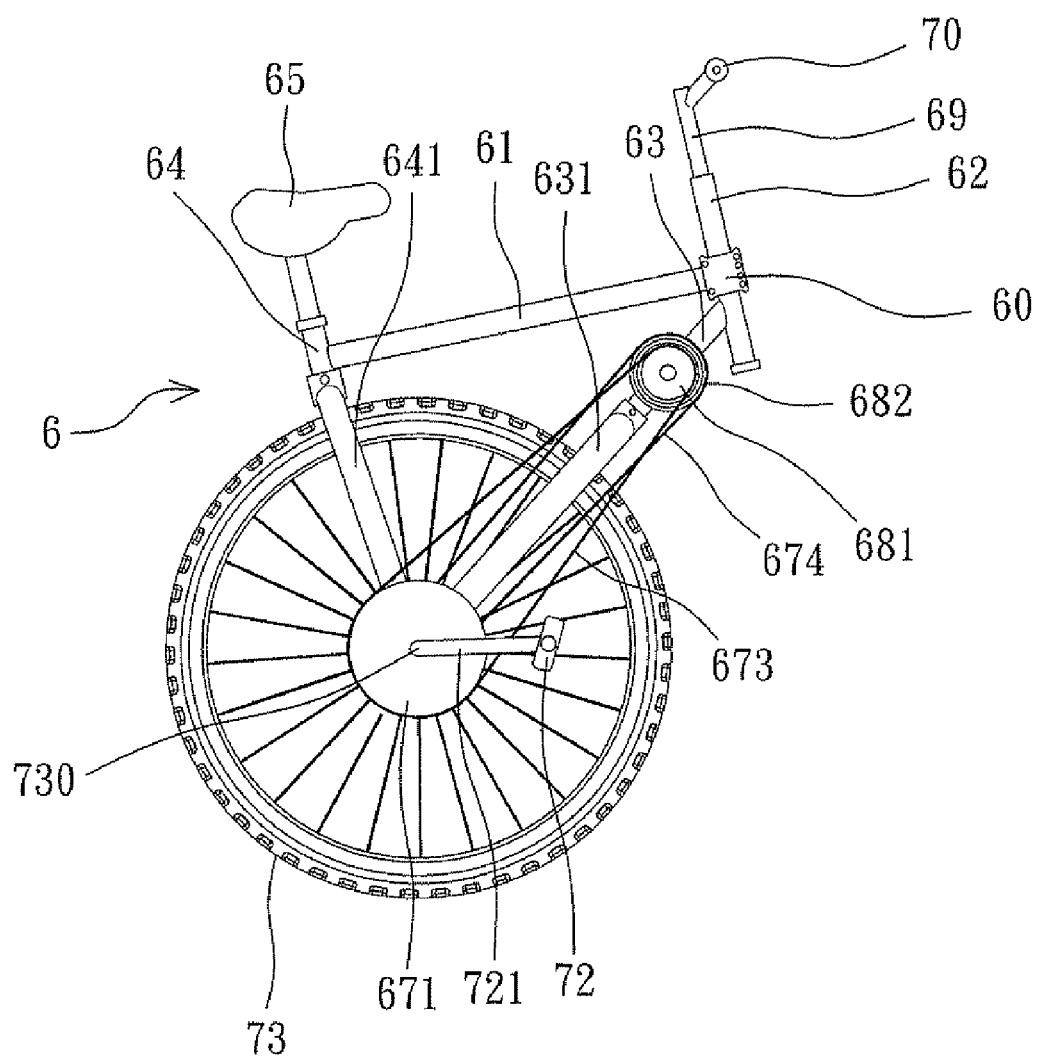
FIG. 15 is a schematic view showing the optional displacement of the associated changeable gear cluster in the auxiliary cycle body for the third exemplary embodiment in the dual riding and driving tricycle in juxtaposing link of the present invention.

Please refer to FIG. 15, which shows the optional displacement of the associated changeable gear cluster 68 in the auxiliary cycle body 6 for the third exemplary embodiment in the dual riding and driving tricycle in juxtaposing link of the present invention. The auxiliary cycle body 6 is modified from the counterpart auxiliary cycle body 6 for the previous second exemplary embodiment by deleting the rear folk 66 and moving the changeable gear cluster 68 onto the down bar 63 so that the auxiliary rear wheel 73 associated with the auxiliary cycle body 6 can also be driven by treading the pair pedals 71, 72 as well to save fabricating cost in material and process.

In concluding the disclosure heretofore, the dual riding and driving tricycle in juxtaposing link of the present invention can attach an auxiliary cycle body 3, 6 to a common bicycle, which serves as a primary bicycle body 1, to achieve the effects in dual riding and independent driving respectively for primary rider and auxiliary rider. The contrivance of the articulation mechanism 5 provides features in keeping balanced stability without risk in overturn or tumble down under most driving conditions other than the recreational effect. Moreover, the simple and reasonable structure for the auxiliary cycle body 3, 6 offers double benefits in reducing manufacturing cost and maintenance expense due to easiness for it.

We claim:

1. A dual riding and driving tricycle, comprising:
   a primary bicycle body includes a front wheel, a rear wheel, a saddle for a rider to sit thereon, a steering handle for controlling a driving direction and a pair of pedals for the rider to power the primary bicycle body;
   an auxiliary cycle body including an auxiliary saddle, an auxiliary wheel and an auxiliary driving mechanism having a pair of pedals so that an auxiliary rider sitting on the auxiliary saddle can pedal the pair of pedals of the auxiliary driving mechanism to power the auxiliary cycle body;
   at least one articulation mechanism including a first linking terminal for coupling with the primary bicycle body, a second linking terminal for coupling with the auxiliary cycle body and a pair of parallel linking beams arranged such that the first linking terminal, the second linking terminal and the two parallel linking beams construct a parallelogram articulation; and
   a resilient tension mechanism including at least two elastic elements such that both ends of each said elastic element are respectively connected to the articulation mechanism.

2. The tricycle as claimed in claim 1, wherein a hub shaft is disposed in a hub of the auxiliary wheel such that individual cranks of the auxiliary cycle body extend in a lateral manner and have respective pedals.

3. The tricycle as claimed in claim 1, wherein said auxiliary driving mechanism of the auxiliary cycle body comprises a removable hub boss integrally fixed on a hub of the auxiliary wheel, wherein a hub shaft is disposed in the hub boss such that individual cranks of the auxiliary cycle body are extended in a lateral manner and have respective pedals; a fixed active gear and a removable passive gear are disposed around the hub of the auxiliary wheel in coaxial fashion but rotate independently such that the active gear is driven by the pair of pedals of the auxiliary driving mechanism and the passive gear is able to drive the removable hub boss; a minor idle wheel and a major idle wheel form an idle wheel set and are disposed around a shaft in coaxial fashion and co-rotate in an interlocked manner such that the minor idle wheel and the major idle wheel respectively mesh with the active gear and the passive gear.

4. The tricycle as claimed in claim 2, wherein a pair of separated fixing jointers are further disposed on the hub shaft of the auxiliary wheel of the auxiliary cycle body, a fixed active gear and a removable passive gear, which are encased in a gear box, are disposed around the hub of the auxiliary wheel in coaxial fashion but rotate independently such that the active gear is driven by the pair pedals of the auxiliary driving mechanism and the passive gear drives the removable hub boss; said gear box contains an idle wheel set of a minor idle wheel and a major idle wheel; both the minor idle wheel and the major idle wheel are disposed around a shaft in coaxial fashion and co-rotate in an interlocked manner such that the minor idle wheel and the major idle wheel respectively mesh with the active gear and the passive gear.

5. The tricycle as claimed in claim 1, wherein the auxiliary driving mechanism of the auxiliary cycle body comprises a removable hub boss integrally fixed on a hub of the auxiliary wheel, wherein a hub shaft is disposed in the hub boss such that individual cranks of the auxiliary driving mechanism extend in a lateral manner and have respective pedals; a major active gear fixed on the hub shaft of the auxiliary wheel and a minor passive gear fixed on the removable hub boss; a changeable gear cluster including a minor derailleur sprocket and a major derailleur sprocket having different diameters; the major active gear and minor derailleur sprocket being linked by an external loop chain while the minor passive gear and the major derailleur sprocket are linked by an internal loop chain.

6. The tricycle as claimed in claim 5, wherein said changeable gear cluster is disposed on a down bar of the auxiliary cycle body.

7. The tricycle as claimed in claim 1, wherein a hypothetical triangle which is defined by three points, the three points being contact points between a riding surface and each of the auxiliary wheel, the front wheel and the rear wheel, has angles of the triangle formed at the rear wheel and the front wheel which are acute angles.

8. The tricycle as claimed in claim 1, wherein said first linking terminal includes a left holding base, said left holding base includes a holding compartment with an opening end facing inwardly while said second linking terminal includes a right holding base, said right holding base includes a holding compartment with an opening end facing inwardly such that two linking trough beams are disposed between the left holding base and right holding base in a parallel manner; wherein a pivotal articulatory parallelogram is formed by the left holding base, the right holding base and the pair of parallel linking trough.

9. The tricycle as claimed in claim 1, wherein said at least two elastic elements includes at least one pair of elastic elements arranged in a diagonal crisscross fashion.

10. The tricycle as claimed in claim 9, wherein each pair of elastic elements in the articulation mechanism is braided into a multi-stranded string or arranged into a multiple crisscross array.

11. The tricycle as claimed in claim 1, wherein each said linking trough beam is ⊓-shaped or ⊔-shaped with an opening.

12. A dual riding and driving tricycle, comprising:
   a primary bicycle body including a linking block with plural positioning holes, a steering handle with two brake levers, a cross top bar, a head sleeve tube having a front stem inserted therein, a down bar, an upright seat bar having a saddle on the top end thereof, a rear folk having a rear wheel with a hub, a front folk having a front wheel with a hub and a primary driving mechanism that includes a major front sprocket wheel with a pair of pedals disposed at the joint of the down bar and upright seat bar, a minor rear gear cluster coaxially disposed with the hub of the rear wheel and a loop chain linked on the front sprocket wheel and rear gear cluster respectively so that a primary rider sitting on the primary saddle can pedal the pair of pedals to drive the primary bicycle;
   an auxiliary cycle body including a linking block with plural positioning holes, a holding handle without brake lever, a cross top bar, a head sleeve tube having a front stem inserted therein, a down bar, an upright seat bar, an auxiliary saddle on the top end of the upright seat bar, an auxiliary wheel and an auxiliary driving mechanism having a pair of pedals so that an auxiliary rider sitting on the auxiliary saddle can pedal the pair of pedals to drive the auxiliary cycle body;
   an articulation mechanism including a left holding base abutted to a first linking terminal, a right holding base abutted to a second linking terminal such that the right holding base is securely locked on the linking block at the head sleeve tube of the auxiliary cycle body while the left holding base is securely locked on the linking block at the head sleeve tube of the primary bicycle body; two linking trough beams are disposed between the left holding base and the right holding base in a parallel manner; a pivotal articulatory parallelogram is formed by the left holding base, the right holding base and the pair of parallel linking trough beams such that the saddle of the primary bicycle body and the saddle of the auxiliary cycle body are always kept in a parallel fashion; and a resilient tension mechanism includes a plurality of elastic elements such that both ends of each of said plurality of elastic elements are securely connected on said articulation mechanism respectively.

13. A dual riding and driving tricycle, comprising:

a primary bicycle body including a front wheel, a rear wheel, a saddle for a rider to sit thereon, a steering handle for the rider to control a driving direction and a pair of pedals for the rider to generate driving power for the primary bicycle body;

an auxiliary cycle body including an auxiliary saddle, an auxiliary wheel with a hub shaft such that the hub shaft of the auxiliary wheel is relatively located between the hubs of the front wheel and the rear wheel in the primary bicycle body along a longitudinal direction, and an auxiliary driving mechanism having a pair of pedals so that an auxiliary rider sitting on the auxiliary saddle can pedal the pair of pedals to drive the auxiliary cycle body;

an articulation mechanism including a first linking terminal for coupling with the primary bicycle body, a second linking terminal for coupling with the auxiliary cycle body and a pair of parallel linking beams such that the first linking terminal, the second linking terminal and the two parallel linking beams form a parallelogram articulation; and a resilient tension mechanism including at least two elastic elements such that both ends of each said elastic element are connected to the articulation mechanism.

14. The tricycle as claimed in claim 13, wherein said plural elastic elements in the articulation mechanism are arranged in diagonal crisscross fashion.

15. The tricycle as claimed in claim 14, wherein the at least two elastic elements includes at least one pair of elastic elements, each pair of elastic elements in the articulation mechanism is braided into a multi-stranded string or arranged into a multiple crisscross array.

16. The tricycle as claimed in claim 13, wherein said auxiliary driving mechanism of the auxiliary cycle body comprises a removable hub boss being integrally fixed on a hub of the auxiliary wheel, a hub shaft is disposed therein such that individual cranks extend in a lateral manner and have respective pedals; an active gear and a passive gear being disposed around the hub of the auxiliary wheel in coaxial fashion but rotating independently such that the active gear is driven by the pair of pedals and the passive gear is able to drive the removable hub boss; a minor idle wheel and a major idle wheel contained in a idle wheel set is disposed around a shaft in coaxial fashion and co-rotates in an interlocked manner so that each minor idle wheel and major idle wheel is meshed with a corresponding said active gear and said passive gear respectively.

17. The tricycle as claimed in claim 13, wherein the auxiliary driving mechanism of the auxiliary cycle body comprises a removable hub boss integrally fixed on a hub of the auxiliary wheel, a hub shaft is disposed in the hub boss such that individual cranks of the auxiliary cycle body extend in a lateral manner and have respective pedals; a major active gear fixed on the hub shaft of the auxiliary wheel and a minor passive gear fixed on the removable hub boss; a changeable gear cluster including a minor derailleur sprocket and a major derailleur sprocket of different diameters; the major active gear and the minor derailleur sprocket is linked by an external loop chain while the minor passive gear and the major derailleur sprocket is linked by an internal loop chain.

18. The tricycle as claimed in claim 17, wherein said changeable gear cluster is disposed on the down bar or the rear folk of the auxiliary cycle body.

\* \* \* \* \*